T. GOLDE.
HINGED VEHICLE HOOD.
APPLICATION FILED DEC. 26, 1911.
1,034,904.
Patented Aug. 6, 1912.
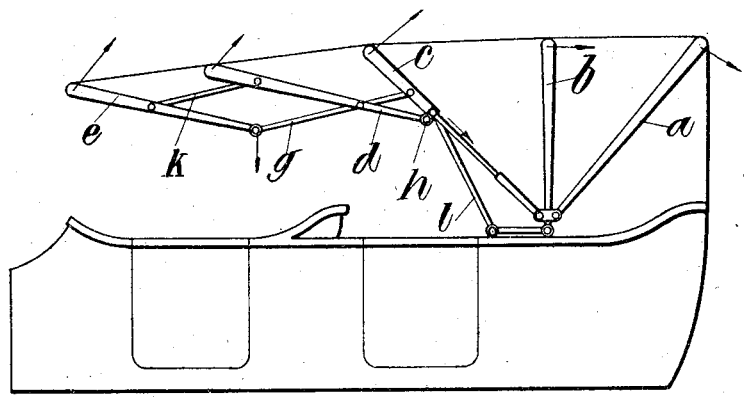
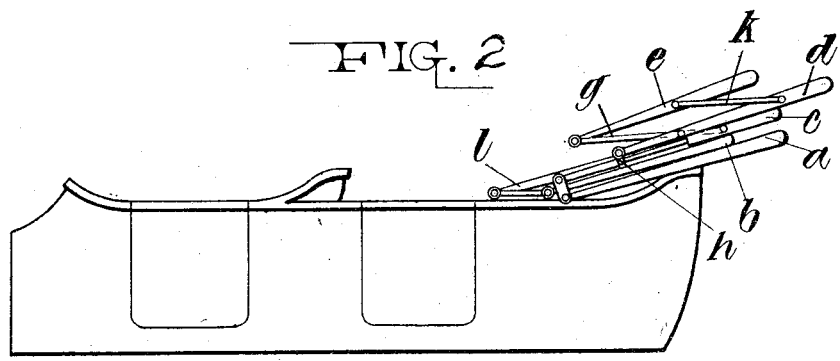

UNITED STATES PATENT OFFICE.

TRAUGOTT GOLDE, OF GERA, GERMANY.

HINGED VEHICLE-HOOD.

1,034,904.  Specification of Letters Patent.  Patented Aug. 6, 1912.

Application filed December 26, 1911. Serial No. 767,578.

*To all whom it may concern:*

Be it known that I, TRAUGOTT GOLDE, a subject of the Emperor of Germany, residing at Gera, in the Principality of Reuss, Younger Line, Germany, have invented a new and Improved Hinged Vehicle-Hood, of which the following is a specification.

This invention relates to a hinged hood for automobiles, boats and other vehicles which is thoroughly braced from end to end and may be readily folded and unfolded.

In the accompanying drawing: Figure 1 is a side view of my improved vehicle hood showing it open, and Fig. 2 a similar view showing it folded.

The device comprises essentially three rear bows $a$, $b$ and $c$ of which the central bow $b$ is pivoted to the carriage body at $b^1$, while bows $a$, $c$ are in turn pivoted to bow $b$. Bow $c$ is reduced in thickness for a portion of its length as at $c^1$ to constitute the race for a slide or runner $h$ to which is pivoted an intermediate bow $d$. Above race $c^1$ there is pivoted to bow $c$ at $g^1$ the rear end of a lever $g$ that crosses bow $d$ and is pivoted thereto at $d^1$. To the forward end of lever $g$ there is pivoted at $k^1$ an outrigger bow $e$ which is also connected to bow $d$ by a pivoted strut $k$ arranged in substantial parallelism with lever $g$.

In order to sustain runner $h$ in its raised position, there is pivoted thereto one arm $l$ of an articulated brace, the other arm $l^1$ of which is pivoted to arm $l$ at $l^2$ and to the lower end of bow $b$ at $b^1$. If the top is lowered into the position shown in Fig. 1, runner $h$ is in its raised position and is securely braced by arm $l$. If the top is folded (Fig. 2) arm $l$ will swing backward together with bow $c$, while runner $h$ will descend along its race $c^1$. By making the brace $l$, $l^1$ articulated and connecting its lower arm to bow $b$, but a single connection is required for the hood at each side of the vehicle body, the link $l^1$ resting loosely with its pivot $l^2$ upon said body, so as to properly brace the hood. In this way the mounting and dismounting of the device is greatly facilitated and a multiplicity of coupling points are dispensed with.

I claim:

A vehicle hood comprising a rear bow, a runner movable thereon, a forwardly extending bow carried by the runner, and a bipartite brace, the first member of which engages the runner, while the second member is pivoted at its forward end to the first member and at its rear end to the vehicle body, the forward end of said second member being loosely supported on said body.

In testimony whereof I affix my signature in the presence of two witnesses.

TRAUGOTT GOLDE.

Witnesses:
 HUGO WILKE,
 CHARLES NEUER.

Copies of this patent may be obtained for five cents each, by addressing the "Commissioner of Patents, Washington, D. C."